Figure 1:
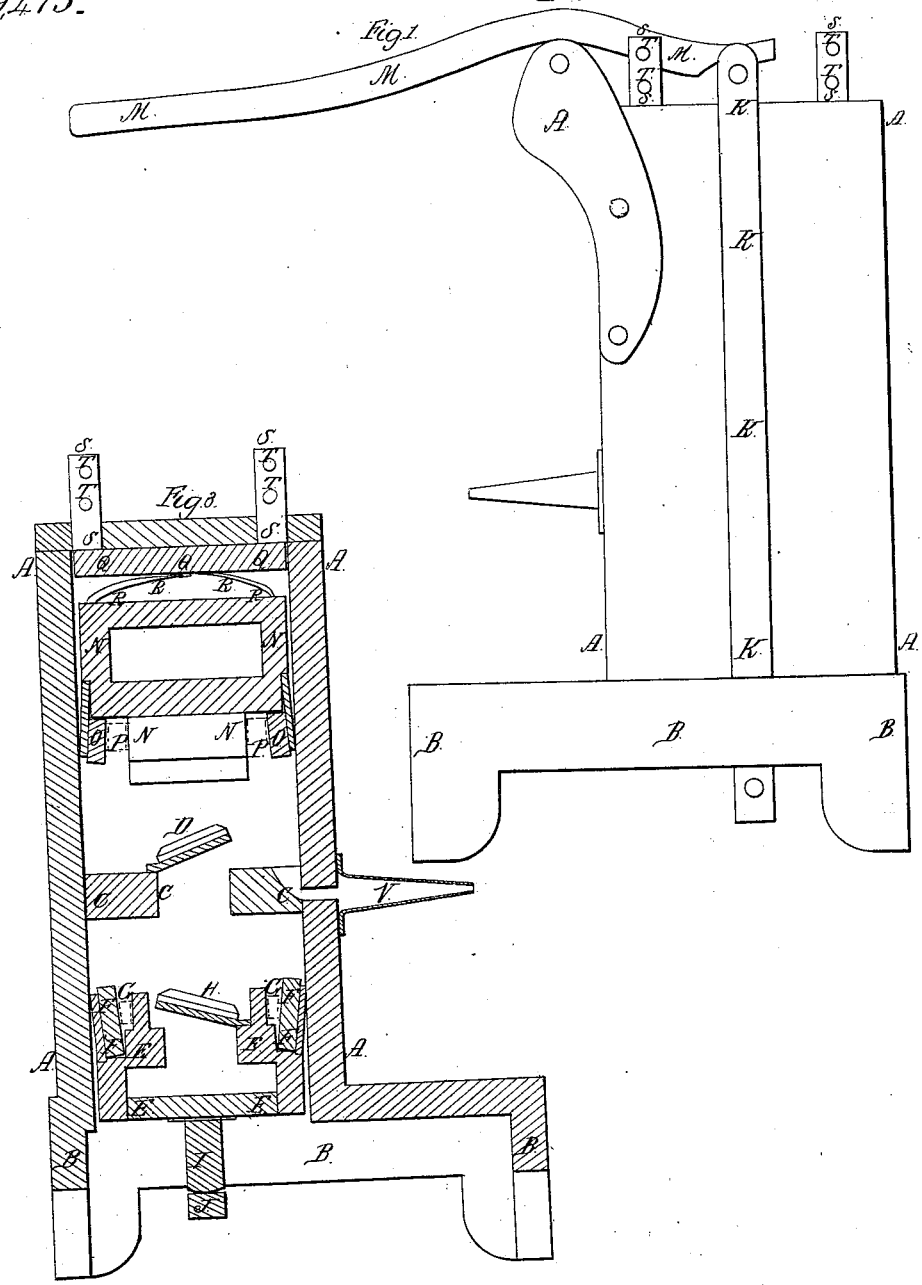

J. Arndt
Bellows
№ 19,475.          Patented Mar. 2, 1858.
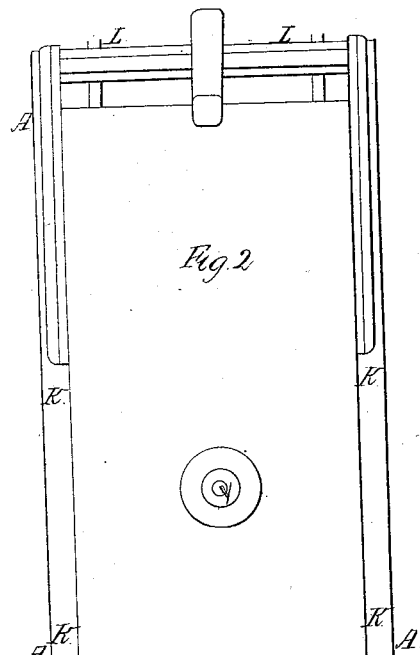
Fig. 2
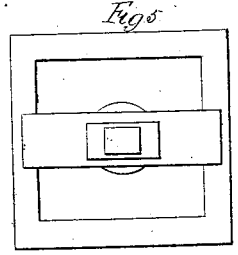
Fig. 5
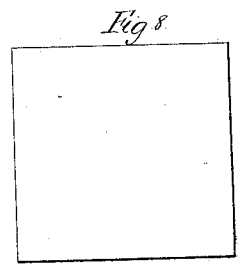
Fig. 8
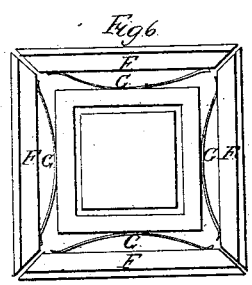
Fig. 6
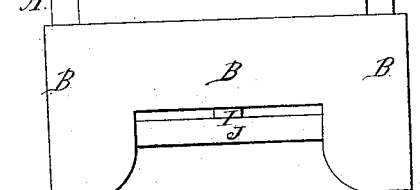
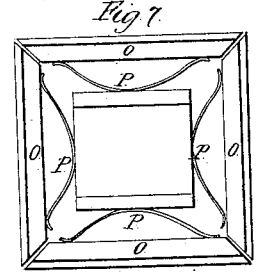
Fig. 7
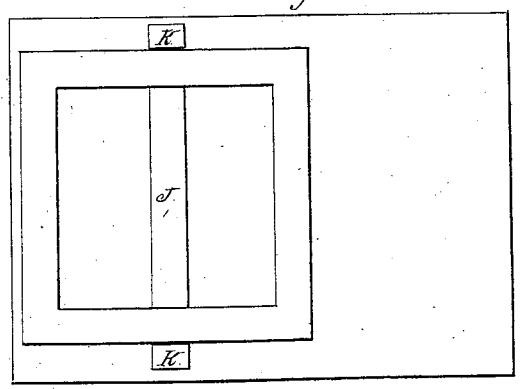
Fig. 4

UNITED STATES PATENT OFFICE.

JACOB ARNDT, OF WHEELING, VIRGINIA.

BELLOWS.

Specification of Letters Patent No. 19,475, dated March 2, 1858.

*To all whom it may concern:*

Be it known that I, JACOB ARNDT, of the city of Wheeling, in the county of Ohio and State of Virginia, have invented a new and useful Improvement on the Bellows to be Used for Smiths' Forges and other Purposes and called the "Hurricane Bellows;" and I do hereby declare that the following is a full, clear, and exact description of the construction and operation of the same, reference being had to the annexed drawings, making a part of this specification, in which—

Figure 1 is a side elevation, Fig. 2 is a front elevation, Fig. 3 is a sectional view, Fig. 4 is a view of the under part of the machine, Fig. 5 the under part of the lower plunger, Fig. 6 the upper part of the lower plunger, Fig. 7 the under part of the upper plunger, and Fig. 8 the upper part of the upper plunger.

A A A A is an oblong right angled trunk resting on platform B B B.

C C C is a dividing plank dividing the trunk into two parts, and in it is placed the valve D.

E E E E is the lower plunger with its four wings F F F F which are hinged on the plunger and are pressed outward by the springs G G G G and prevent the air from passing around the plunger in its motion.

H is a valve in the plunger E E E E.

I is a piece projecting downward from the bottom of the plunger and attached to the cross piece J. The cross piece J is attached to the lower ends of the side arms K K K K. The side arms K K K K are attached at the top to the cross piece L. The cross piece L is attached to the end of the working lever M M M.

N N N N is the upper plunger with its four wings O O O O which are hinged on the plunger and are pressed outward by the springs P P P P. On the top of the plunger N N N N is placed a weight (not shown in the drawing).

Q Q Q Q is a movable gage to govern the length of the blast and to which are attached the springs R R R R against which is pressed and which gives a yielding motion to the upper plunger N N N N when the blast is in operation. Attached to the upper side of the movable gage Q Q Q are the uprights S S S S in which are the holes T T for the insertion of pins for the purpose of raising and lowering the gage to any desired point and regulating the extent of the blast, the movable gage Q Q Q being raised or lowered as occasion may require.

V is the throat where the wind is to escape. By working the lever M M M the lower plunger E E E E is put in operation and the air coming in through the plunger valve H and being forced through the middle valve D is pressed against the upper plunger N N N N which is forced downward by its own weight or by adding thereto if necessary, and acting upon the springs R R R R a continuous blast is consequently forced out at the throat V.

I do not claim the movable wings with the springs attached as they are but a modification of the well known arrangement of metallic packing but

I claim as my invention—

The combination of the trunk A A A A with the lower plunger E E E E, the upper plunger N N N N and the blast gage Q Q Q substantially as and for the purposes set forth.

JACOB ARNDT.

Witnesses:
JOHN CLARK,
JAMES M. CONNELL.